US011459926B2

(12) United States Patent
Staller et al.

(10) Patent No.: US 11,459,926 B2
(45) Date of Patent: Oct. 4, 2022

(54) APPARATUS, SYSTEM, AND METHOD FOR OXIDIZING METHANE IN A LEAN-BURN ENGINE EXHAUST

(71) Applicant: Miratech Group, LLC, Tulsa, OK (US)

(72) Inventors: Tracy D. Staller, Seymour, TN (US); Steven G. DeCicco, Knoxville, TN (US)

(73) Assignee: MIRATECH GROUP, LLC, Tulsa, OK (US)

( * ) Notice: Subject to any disclaimer, the term of this patent is extended or adjusted under 35 U.S.C. 154(b) by 0 days.

(21) Appl. No.: 17/482,633

(22) Filed: Sep. 23, 2021

(65) Prior Publication Data
US 2022/0090528 A1    Mar. 24, 2022

Related U.S. Application Data

(60) Provisional application No. 63/082,705, filed on Sep. 24, 2020.

(51) Int. Cl.
*F01N 3/10*    (2006.01)
*B01J 35/00*    (2006.01)
(Continued)

(52) U.S. Cl.
CPC .............. *F01N 3/103* (2013.01); *B01J 21/04* (2013.01); *B01J 23/42* (2013.01); *B01J 23/44* (2013.01);
(Continued)

(58) Field of Classification Search
CPC ... B01J 21/04; B01J 23/42; B01J 23/44; B01J 23/464; B01J 35/0026; B01J 37/038;
(Continued)

(56) References Cited

U.S. PATENT DOCUMENTS 6,244,044 B1    6/2001 Bartley
6,832,473 B2    12/2004 Kupe et al.
(Continued)

FOREIGN PATENT DOCUMENTS

| DE | 102018211890 | 1/2020 |
|----|--------------|--------|
| EP | 1057988 | 11/2003 |
| WO | 0076637 | 12/2000 |
| WO | 2007087725 | 8/2007 |

OTHER PUBLICATIONS

PCT/US2021/051638—International Preliminary Report With International Search Report and Written Opinion; dated Jan. 19, 2022.

*Primary Examiner* — Audrey B. Walter
*Assistant Examiner* — Dapinder Singh
(74) *Attorney, Agent, or Firm* — Dennis D. Brown; Brown Patent Law, P.L.L.C.

(57) ABSTRACT

A system, apparatus, and method for oxidizing methane in the exhaust gas from a lean-burn combustion gas engine in which a syngas stream comprising $H_2$ and CO, or a combustible hydrocarbon with a light-off temperature at or below the temperature of the engine exhaust temperature, is added to and combined with the engine exhaust stream and passed through an oxidation catalyst whereupon the combustible gas oxidizes and increases the operating temperature of a platinum group oxidation catalyst sufficiently to exceed the light-off temperature of the platinum group catalyst for oxidizing methane emissions contained in the engine exhaust stream.

29 Claims, 2 Drawing Sheets

(51) Int. Cl.
*B01J 21/04* (2006.01)
*B01J 23/42* (2006.01)
*B01J 23/44* (2006.01)
*B01J 37/03* (2006.01)
*B01J 23/46* (2006.01)

(52) U.S. Cl.
CPC ......... *B01J 23/464* (2013.01); *B01J 35/0026* (2013.01); *B01J 37/038* (2013.01); *F01N 2570/12* (2013.01)

(58) Field of Classification Search
CPC ........ F01N 3/103; F01N 3/36; F01N 13/0093; F01N 2570/12; F01N 2610/04; F01N 2610/05; F01N 2610/06
See application file for complete search history.

(56) References Cited

U.S. PATENT DOCUMENTS

| | | | |
|---|---|---|---|
| 7,673,447 | B2 | 3/2010 | Gaiser |
| 8,037,674 | B2* | 10/2011 | Kupe ................... F01N 3/0828 60/303 |
| 8,631,647 | B2 | 1/2014 | Neels et al. |
| 9,673,465 | B2* | 6/2017 | Nagaoka ................... C01B 3/40 |
| 10,184,374 | B2* | 1/2019 | Han ................... F02M 21/0209 |
| 2011/0005204 | A1 | 1/2011 | Bandi-Konrad et al. |
| 2014/0090362 | A1 | 4/2014 | Eckhoff et al. |
| 2015/0078975 | A1 | 3/2015 | Mahakul |
| 2015/0166913 | A1* | 6/2015 | Brody ................... F02M 27/02 48/127.7 |

* cited by examiner

APPARATUS, SYSTEM, AND METHOD FOR OXIDIZING METHANE IN A LEAN-BURN ENGINE EXHAUST

RELATED CASE

This application claims the benefit of U.S. Provisional Patent Application Ser. No. 63/082,705 filed on Sep. 24, 2020 and incorporates said provisional application by reference into this document as if fully set out at this point.

FIELD OF THE INVENTION

The present invention relates to apparatuses, systems, and methods for oxidizing methane and other exhaust emissions produced by lean-burn combustion engines.

BACKGROUND OF THE INVENTION

A need exists for a method, system and apparatus which will allow the use of high efficiency platinum group catalytic metals, particularly palladium and/or platinum, for oxidizing methane and other emissions contained in the exhaust streams produced by lean-burn 4-stroke gas engines and lean-burn 2-stroke gas engines. Methane is the most difficult of the common exhaust hydrocarbons to catalytically oxidize and has received increased consideration for reduction of emissions given its high $CO_2$ equivalency (approximately 28 times greater greenhouse potential as compared with $CO_2$).

Heretofore, a system for effectively using high efficiency palladium and/or platinum oxidation catalysts for oxidizing the methane emissions contained in these exhaust streams, has not been available. This is because the relatively cold temperatures of the exhaust streams produced by these engines are significantly lower than the required methane "light-off" temperatures for palladium and/or platinum catalysts—the light-off temperature being defined as the temperature that sustains 50% conversion. In addition, at the relatively low exhaust temperature range of these combustion sources palladium catalysts tend to be vulnerable to deactivation caused by exposure to sulfur in the combustion exhausts from many gaseous fuels.

Lean-burn 4-stroke gas engines, which typically burn natural gas, are commonly used for energy production (natural gas compression, distributed and/or backup electrical generation), and numerous industrial and agricultural purposes. Two-stroke lean-burn gas engines, which also typically burn natural gas, are commonly used for natural gas compression.

The temperature of the exhaust stream leaving a lean-burn 4-stroke gas engine will typically only be in the range of from about 700° F. to about 850° F. and the temperature of the exhaust stream leaving a 2-stroke lean-burn engine will be even lower, typically only in the range of from about 400° F. to about 500° F. Typically, an exhaust gas oxidation catalyst is positioned downstream of the engine such that heat losses in the exhaust pipe cause the catalyst operating temperature to be even lower.

Unfortunately, at these low temperatures, even a large quantity of fresh palladium and/or platinum catalyst material, which is quite costly, will not be effective for oxidizing the methane emissions contained in the exhaust streams. For a lean-burn 4-stroke engine at an exhaust temperature of 700° F. and a low gas hourly space velocity (GHSV) through the catalyst of 45,000 (i.e., ±10%) $hr^{-1}$, the amount of the methane removed from the exhaust stream by a combination palladium and platinum catalyst material will typically be less than 10%.

Moreover, the situation for 2-stroke lean-burn gas engines is even more difficult. Compared with 4-stroke lean-burn gas engines, 2-stroke lean-burn engines tend to allow more fuel to pass through the cylinders unburned. The result is higher exhaust emissions of hydrocarbons, including methane. In addition, although conventional oxidation catalysts have been at least somewhat effective for destroying volatile organic compounds (VOCs), including non-methane and non-ethane hydrocarbons, contained in the exhaust streams produced by 4-stroke lean-burn gas engines, the lower exhaust temperatures of many 2-stroke lean-burn gas engines further limits the effectiveness of conventional oxidation catalysts for destroying methane, VOCs, and non-methane and non-ethane hydrocarbon emissions contained in the 2-stroke exhaust streams.

SUMMARY OF THE INVENTION

The present invention provides a method, system, and apparatus which satisfy the needs and alleviate the problems discussed above. The inventive method, system, and apparatus allow high efficiency palladium, platinum, and/or rhodium catalysts to be used for oxidizing hydrocarbons and particularly methane in lean-burn engine exhaust streams, which are relatively cold, by adding an amount of a combustible gas to the exhaust stream that when oxidized on the exhaust gas oxidation catalyst will raise the operating temperature of the oxidation catalyst above the methane light-off temperature. The combustible gas or gases (a) have light-off temperatures on the oxidation catalyst that are at or below the normal oxidation catalyst operating temperature of the exhaust downstream of these gas engines, and (b) are substantially combusted as they pass through the palladium, platinum, and/or rhodium oxidation catalyst, thus producing a catalyst operating temperature which is above the methane light-off temperature of the catalyst. The combustible gas may be a syngas produced by partially oxidizing and/or reforming a fuel gas; the syngas comprising hydrogen, carbon monoxide, and other compounds.

The inventive method, system, and apparatus provide a very high level of methane destruction, while also providing even greater levels of destruction for ethane and propane, as well as very high levels of destruction of CO and formaldehyde emissions. The results provided by the present invention are also surprising in view of the fact that the syngas added to the engine exhaust may, if produced by reforming natural gas, include a greater amount of methane than the lean-burn engine exhaust itself. By increasing the temperature of the high efficiency palladium, platinum, and/or rhodium oxidation catalyst above the methane light-off temperature of the oxidation catalyst, the addition of the syngas to the lean-burn engine exhaust stream and the subsequent oxidation of the syngas in the oxidation catalyst results in all or substantially all of the methane in the mixed exhaust and syngas stream being oxidized by the high efficiency catalyst so that the amount of methane, if any, in the exhaust stream following oxidation by the high efficiency catalyst is significantly less than the amount of methane in the engine exhaust stream prior to the addition of the syngas.

In one aspect, there is provided a method of oxidizing methane in an exhaust gas produced by a lean-burn engine. The method preferably comprises the steps of (a) discharging from the lean-burn engine an exhaust gas stream which comprises an amount of methane, the exhaust gas stream having a temperature of less than 900° F.; (b) delivering the exhaust gas stream through an exhaust oxidation system of an oxidation assembly, the exhaust oxidation system having one or more exhaust oxidation stages, the one or more exhaust oxidation stages comprising at least a final oxidation stage, the final oxidation stage having an oxidation catalyst therein which comprises one or more of platinum, palladium, and rhodium, and the temperature of the exhaust gas stream being less than a methane light-off temperature of the oxidation catalyst in the final oxidation stage; and (c) prior to step (b), adding a combustible gas stream to the exhaust gas stream which flows through the exhaust oxidation system with the exhaust gas stream and is oxidized in the one or more exhaust oxidation stages to increase the temperature of the exhaust gas stream and heat the oxidation catalyst in the final oxidation stage to a temperature above the methane light-off temperature of the oxidation catalyst, the combustible gas stream and the exhaust gas stream forming a combined exhaust gas and combustible gas stream, the combustible gas stream having a light-off temperature on the oxidation catalyst in the final oxidation stage which is less than the methane light-off temperature of the oxidation catalyst, the combined exhaust gas and combustible gas stream having a temperature upstream of the one or more exhaust oxidation stages of the exhaust oxidation system which is less than the methane light-off temperature of the oxidation catalyst, and the light-off temperature of the combustible gas stream on the oxidation catalyst being less than or equal to the temperature of the combined exhaust gas and combustible gas stream upstream of the one or more exhaust oxidation stages of the exhaust oxidation system.

In another aspect, there is provided an oxidation system for oxidizing methane in an exhaust gas stream produced by a lean-burn engine. The oxidation system preferably comprises: (a) one or more exhaust oxidation stages through which the exhaust gas stream is delivered, the one or more exhaust oxidation stages comprising at least a final oxidation stage, the final oxidation stage having an exhaust oxidation catalyst therein which comprises one or more of platinum, palladium, and rhodium in a total amount of from about 5 grams to about 120 grams (i.e., ±10%) per cubic foot of the exhaust oxidation catalyst, and the exhaust oxidation catalyst having a methane light-off temperature which is greater than a temperature of the exhaust gas stream; (b) a syngas reactor in which a syngas stream comprising $H_2$ and CO is produced by partial oxidation of a fuel-rich mixture comprising a stream of fuel having a stream of air combined therewith, the syngas stream being added to the exhaust gas stream prior to delivering the exhaust gas stream through the one or more exhaust oxidation stages, and the syngas stream being added to the exhaust gas stream and oxidized in the one or more exhaust oxidation stages in an amount sufficient to heat the exhaust oxidation catalyst in the final oxidation stage to a temperature above the methane light-off temperature of the exhaust oxidation catalyst; and (c) a control system which directly or indirectly maintains the temperature of the exhaust oxidation catalyst in the final oxidation stage above the methane light-off temperature of the exhaust oxidation catalyst by directly or indirectly controlling the amount of the syngas stream which is added to the exhaust gas stream.

In another aspect, the exhaust oxidation system can further comprise (i) the one or more exhaust oxidation stages comprising an initial oxidation stage and the final oxidation stage and (ii) the initial oxidation stage having an initial stage oxidation catalyst therein which comprises from about 5 to about 90 grams (i.e., ±10%) of platinum, palladium, and/or rhodium per cubic foot of the initial stage oxidation catalyst.

In another aspect, there is provided a method of oxidizing an engine exhaust stream from a lean-burn combustion engine. The method preferably first comprises running the engine through a start-up phase to a post start-up phase to heat the system. During the post start-up phase, the engine exhaust stream comprises methane. Also during the post start-up phase, the method preferably further comprises the steps of: (a) introducing to the engine exhaust stream a stream of gas comprising combustible compounds that light-off on an oxidation catalyst at or below the normal catalyst operating temperature in the exhaust downstream of a lean-burn engine, to produce an exhaust stream comprising combustible gas compounds, and (b) delivering such exhaust with combustible gas compounds through an oxidation system, comprising an oxidation catalyst, such that the combustible compounds oxidize on the catalyst, liberate heat, and raise the temperature of the oxidation catalyst to a level that increases the oxidation of methane. The oxidation catalyst preferably comprises platinum, palladium, and/or rhodium. Although the engine exhaust stream typically has a temperature in the post start-up phase of less than 850° F., the combustible gas is added to the engine exhaust stream in step (a) in an amount which is controlled, directly or indirectly, to maintain an operating temperature of the oxidation catalyst of at least 1000° F. during step (b).

In another aspect, there is provided an apparatus for oxidizing methane emissions in an exhaust stream produced by a lean-burn combustion engine The system preferably comprises: (i) a lean-burn gas engine exhaust stream, the engine exhaust stream having methane therein; (ii) an exhaust oxidation system receiving the engine exhaust stream, comprising a catalyst for oxidizing the engine exhaust, the catalyst comprising one or more of platinum, palladium, and rhodium in a total amount of from about 5 grams to about 120 grams (i.e., ±10%) per cubic foot of the oxidation catalyst; (iii) a syngas reactor which produces a syngas comprising combustible gaseous compounds $H_2$ and CO, the syngas reactor having a catalyst selected from: a partial oxidation catalyst which comprises one or more of platinum, palladium, and rhodium in a total amount of from about 10 grams to about 150 grams (i.e., ±10%) per cubic foot of the partial oxidation catalyst, a steam reforming catalyst which comprises one or more of platinum, palladium, and rhodium in a total amount of from about 2 grams to about 90 grams (i.e., ±10%) per cubic foot of the steam reforming catalyst, or a combination thereof; (iv) a gaseous fuel stream flowing to the syngas reactor where it will be reformed into a syngas; (v) an optional fuel heater to increase the temperature of the fuel flowing to the syngas reactor; (vi) an air stream flowing to the syngas reactor which will react with fuel in the syngas reactor to form a syngas; (vii) an air heater to increase the temperature of the air flowing to the syngas reactor; (viii) a heated air stream flowing from the air heater to the syngas reactor; (ix) a syngas stream flowing from the syngas reactor to the engine exhaust stream comprising combustible gaseous compounds; (x) a device to mix the syngas into the engine exhaust gas; and (xi) a control system which automatically controls an amount of the fuel stream delivered to the syngas reactor directly, or indirectly, to maintain an operating temperature of the oxidation catalyst of the exhaust oxidation system of at least 1000° F., and an amount of air delivered to the syngas reactor to directly or indirectly maintain a desired fuel-air ratio.

In another aspect, there is provided an engine system which preferably comprises: (i) a lean-burn engine which produces an engine exhaust stream comprising methane; (ii) an engine exhaust line which delivers the engine exhaust stream from the lean-burn engine to the first stage oxidation system; (iii) a first stage oxidation system comprising a first stage oxidation catalyst which comprises one or more of platinum, palladium, and rhodium in a total amount of from about 5 grams to about 90 grams (i.e., ±10%) per cubic foot of the first stage oxidation catalyst; (iv) a line which delivers an intermediate exhaust stream from the first stage oxidation system to the second stage oxidation system; (v) a second stage oxidation system comprising a second stage oxidation catalyst which comprises palladium, platinum, and/or rhodium in a total amount of from about 5 grams to about 120 grams (i.e., ±10%) per cubic foot of the second stage oxidation catalyst; (vi) a syngas reactor comprising a catalyst selected from: a partial oxidation catalyst which comprises one or more of platinum, palladium, and rhodium in a total amount of from about 10 grams to about 150 grams (i.e., ±10%) per cubic foot of the partial oxidation catalyst, a steam reforming catalyst which comprises one or more of platinum, palladium, and rhodium in a total amount of from about 2 grams to about 90 grams (i.e., ±10%) per cubic foot of the steam reforming catalyst, or a combination thereof; (vii) a fuel line which delivers an amount of a fuel to the syngas reactor; (vii) an air stream flowing to the syngas reactor which will react with fuel in the syngas reactor to form a syngas; (viii) an air heater; (ix) an air line which delivers heated air from the air heater to the syngas reactor; (x) a syngas line which delivers the syngas from the syngas reactor to the engine exhaust line; and (xi) a control system with sensors and controls to automatically control the flow rates of fuel and air flowing to the syngas reactor.

Further objects, features, and advantages of the present invention will be apparent to those in the art upon examining the accompanying drawings and upon reading the detailed description of the preferred embodiments.

DETAILED DESCRIPTION OF THE PREFERRED EMBODIMENTS

Figure 1:
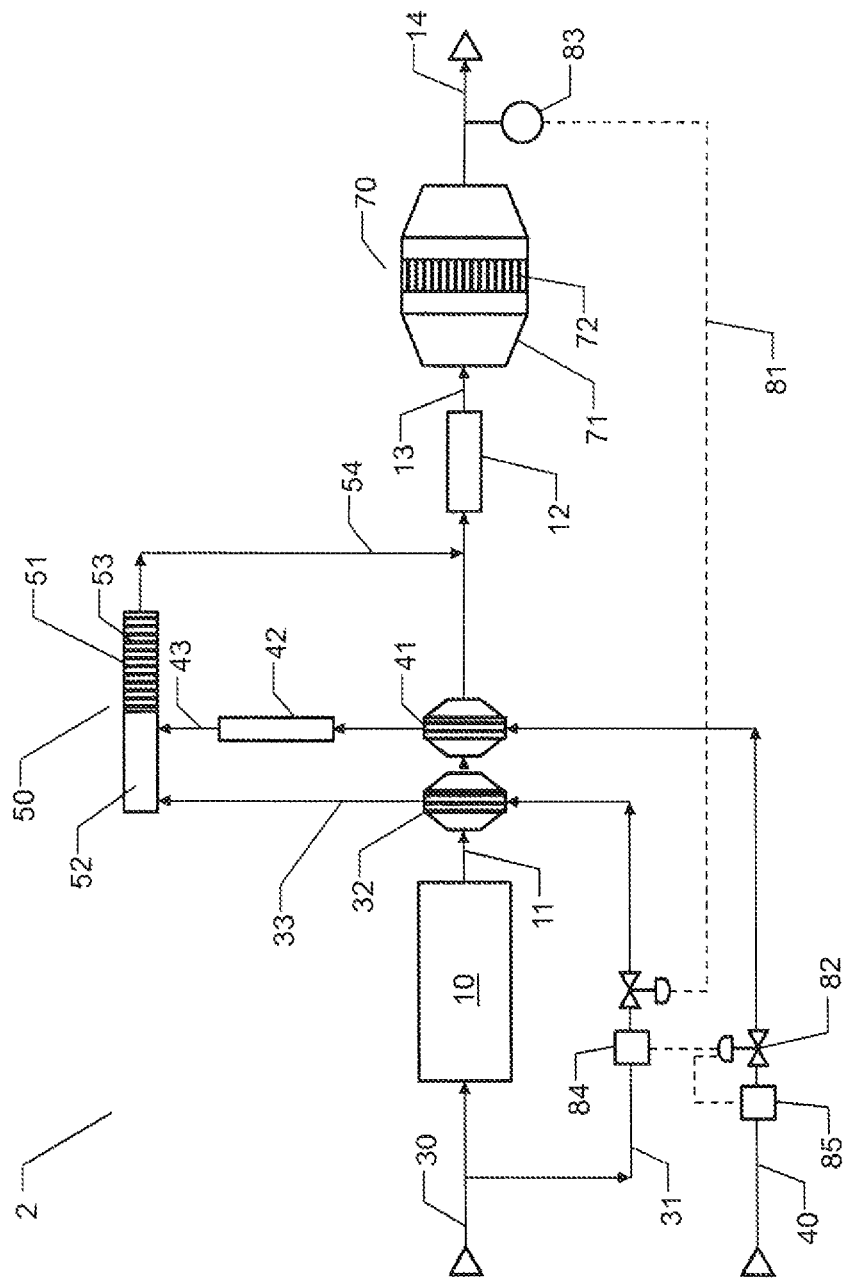
FIG. 1 schematically illustrates an embodiment 2 of the system and apparatus provided by the present invention for oxidizing methane and other emissions in an exhaust stream produced by a lean-burn engine. The system and apparatus shown utilize a fuel heater, a two-stage air heater, and a single-stage exhaust oxidation system.

An embodiment 2 of the inventive system for oxidizing methane and other emissions contained in an exhaust stream produced by a lean-burn gas engine 10 is illustrated in FIG. 1. The inventive system 2 preferably comprises: a fuel line 30 which delivers a pressurized gaseous fuel stream to the combustion engine 10 and an engine exhaust line 11 which delivers the engine exhaust stream from the engine 10 to an inventive oxidation assembly.

The inventive oxidation assembly preferably comprises: a mixer 12 in the engine exhaust line 11 which mixes a syngas stream with the engine exhaust stream for delivery of the mixture 13 to the exhaust oxidation system 70; an exhaust oxidation system 70 which receives the mixture of exhaust gas and syngas from the mixer 12; a syngas reactor 50 which produces a syngas stream comprising $H_2$ and CO; a fuel line 31 which delivers a gaseous fuel stream to the syngas reactor 50; a fuel heater 32 which utilizes heat in the engine exhaust line 11 to preheat the gaseous fuel supplied to the syngas reactor 50; a heated gaseous fuel line 33 which transports heated fuel from the fuel heater 32 to the syngas reactor 50; an air supply line 40 which supplies pressurized air to the syngas reactor 50; an air heater 41 which utilizes heat in the engine exhaust line 11 to preheat the air supply for the syngas reactor 50; an air booster heater 42 that increases the temperature of the preheated air supply leaving air heater 41; a heated air line 43 which delivers the heated air to the syngas reactor 50 from the air booster heater 42; a syngas line 54 which delivers the syngas stream from the syngas reactor 50 to the engine exhaust line 11; a control system 81 which directly or indirectly controls the operating temperature of the oxidation catalyst 72 in the exhaust oxidation system 70; and a control system 82 which directly or indirectly controls the air flow rate to the syngas reactor 50 to maintain an air-fuel ratio for the syngas reactor.

As used herein and in the claims, the term "line" means and includes one, or a series, of pipe(s), duct(s), or any other conduit(s) suitable for carrying the fluid in question.

It will be understood that the inventive oxidation assembly can alternatively be provided without the syngas reactor 50 and that the syngas stream can instead be provided by an outside source, such as, e.g., a plant steam reformer unit. When supplied to the inventive system 2 from an outside source, the flow of the syngas stream to the inventive system 2 can be directly controlled to ensure that an adequate operating temperature of the catalyst in the exhaust oxidation system is maintained.

The lean-burn engine 10 can be any type of lean-burn engine which produces an exhaust that comprises methane. The lean-burn engine 10 shown in the inventive system 2 will typically be a 4-stroke lean-burn gas engine or a 2-stroke lean-burn gas engine and will most preferably be a 4-stroke lean-burn gas engine. The gaseous fuel delivered to the lean-burn engine 10 via the engine fuel line 30 will preferably be natural gas. However, examples of other fuels which could alternatively be combusted in the lean-burn engine 10 include, but are not limited to, digester gas, landfill gas, and LP gas.

The methane content of natural gas is typically greater than 85% by volume. Consequently, once the start-up phase of the inventive process has been completed and the exhaust temperature of the lean-burn engine 10 has reached steady state, the engine exhaust stream 11 produced by combusting natural gas in the lean-burn engine 10 will typically have a methane concentration in the range of from about 800 ppm to about 4000 ppm (i.e., ±10%) by volume (in other words, from 720 ppm to 4400 ppm by volume).

The exhaust oxidation system 70 used in the inventive system 2 preferably comprises an oxidation catalyst housing 71 having the oxidation catalyst 72 provided therein. The oxidation catalyst 72 preferably comprises palladium, platinum, and/or rhodium (most preferably palladium and platinum) in a total amount in the range of from about 5 grams to about 120 grams (i.e., ±10%) per cubic foot of the oxidation catalyst.

More preferably, the oxidation catalyst 72 comprises: (a) a support or substrate formed of a material selected from cordierite, mullite or FeCrAlY or similar high temperature foil (most preferably high temperature foil); (b) a washcoat, applied to the support or substrate, comprising one or more materials selected from aluminum oxide, cerium oxide, zirconium oxide, or silicon dioxide (most preferably aluminum oxide); (c) palladium, provided on and/or in the washcoat in an amount in the range of from 0 grams to about 120 grams (i.e., up to an additional 10%) per cubic foot (in other words, from 0 grams to 132 grams per cubic foot) of the oxidation catalyst 72; (d) platinum, provided on and/or in the washcoat in an amount in the range of from 0 grams to about 120 grams (i.e., up to an additional 10%) per cubic foot of the oxidation catalyst 72; (d) rhodium, provided on and/or in the washcoat in an amount in the range of from 0 grams to about 120 grams (i.e., up to an additional 10%) per cubic foot of the oxidation catalyst 72; and (e) for a total amount of platinum, palladium and rhodium of from about 5 grams to about 120 grams (i.e., ±10%) per cubic foot (in other words, from 4.5 grams to 132 grams per cubic foot) of the oxidation catalyst 72.

Examples of additional components and/or additives which can be used in the oxidation catalyst 72 (e.g., in the washcoat) include lanthanum oxide, barium oxide, barium carbonate, cerium oxide, zirconium oxide and mixtures thereof.

The syngas reactor 50 comprises a syngas reactor housing 51 having a syngas catalyst 53 provided therein. The syngas catalyst 53 is preferably selected from: a partial oxidation catalyst which comprises one or more of platinum, palladium, and rhodium in a total amount of from about 10 grams to about 150 grams (i.e., ±10%) per cubic foot of the partial oxidation catalyst, a steam reforming catalyst which comprises one or more of platinum, palladium, and rhodium in a total amount of from about 2 grams to about 90 grams (i.e., ±10%) per cubic foot of the steam reforming catalyst, or a combination thereof. The housing 51 of syngas reactor 50 preferably also includes a mixing chamber 52, upstream of the syngas catalyst 53, for mixing the fuel and air streams, 33 and 43 respectively, delivered to the syngas reactor 50 before the mixed stream enters syngas catalyst 53. The mixing chamber 52 may include elements including baffles, tabs or other mixing structures or devices therein for mixing the fuel and air streams. The fuel 31 used in the syngas reactor 50 for producing the syngas stream 54 will preferably be the same natural gas or other fuel as is used in the lean-burn engine 10, but other fuels may also be used.

More preferably, the syngas catalyst 53 comprises: (a) a partial oxidation catalyst comprised of (i) a support or substrate formed of a material selected from cordierite, mullite or FeCrAlY or similar high temperature foil (most preferably high temperature foil) and having a cell density of from about 100 to about 700 (i.e., 10%) cells per inch² (in other words, from 90 to 770 cells per inch²); (ii) a washcoat, applied to the support or substrate, comprising one or more materials selected from aluminum oxide, cerium oxide, zirconium oxide, or silicon dioxide (most preferably aluminum oxide); and (iii) palladium, platinum, and/or rhodium (preferably palladium), provided on and/or in the washcoat, in a total amount in the range of from about 10 grams to about 150 grams (i.e., ±10%) per cubic foot of the partial oxidation catalyst; (b) a steam reforming catalyst comprised of (i) a support or substrate formed of a material selected from cordierite, mullite or FeCrAlY or similar high temperature foil (most preferably high temperature foil) and having a cell density of from about 100 to about 700 (i.e., ±10%) cells per inch²; (ii) a washcoat, applied to the support or substrate, comprising one or more materials selected from aluminum oxide, cerium oxide, zirconium oxide, or silicon dioxide (most preferably aluminum oxide); and (iii) palladium, platinum, and/or rhodium (preferably platinum and rhodium), provided on and/or in the washcoat, in a total amount in the range of from about 2 grams to about 90 grams (i.e., ±10%) per cubic foot of the steam reforming catalyst.

Examples of additional components and/or additives which can be used in the partial oxidation catalyst or steam reforming catalyst utilized as a component of the syngas catalyst 53 (e.g., in the washcoat of the catalyst) include lanthanum oxide, barium oxide, cerium oxide, zirconium oxide, or other rare earth oxides such as praseodymium oxide.

The source of air 40 supplied to the system can be any type of prime mover such as a blower or compressor, or other system effective for delivering the air stream 40 through the air heater 41 and air booster heater 42, through the syngas reactor 50, and into the engine exhaust line 11. The source of air supplied to the system will preferably comprise a positive displacement blower. The flow rate of air can be controlled by a valve, variable speed motor on the prime mover, or other device.

The syngas catalyst 53 requires the mixed fuel-air stream to be at a minimum temperature of 700° F. to exceed the light-off temperature of the syngas reactions. This can be accomplished by heating the air stream 40 alone or by heating both the air stream 40 and the fuel stream 31. In the preferred embodiment shown in FIG. 1 both the air and the fuel streams are heated prior to introducing them to the syngas reactor mixing chamber 52.

The device for heating the air stream 40 can be (i) a heat exchanger utilizing heat from the engine exhaust 41, (ii) an electric heater 42, or (iii) any combination thereof. If only the air is being heated and not the fuel also, then the temperature required for the heated air could be greater than 1100° F., which would exceed the temperature of the engine exhaust stream 11. This would necessitate either using an electric heater 42 alone that can reach the desired temperature of at least 1100° F., or an electric heater in combination with a heat exchanger 41. The use of an electric air heater 42 assures good temperature control of the air and the air-fuel mixture in the syngas reactor mixing chamber 52, regardless of any fluctuations in the operation of the lean-burn engine 10. The heat input of the electric air heater 42 can be automatically controlled, if desired, to maintain a desired temperature of the syngas catalyst, the fuel and air mixture, or the syngas product temperature.

The mixer 12 used for mixing the syngas stream 54 with the engine exhaust stream 11 can be any type of mixer effective for achieving a concentration coefficient of variation (Cv) of less than 10%. The mixer 12 can utilize one or more mixing elements selected from injectors, baffles, tabs, venturis or similar elements. The mixing elements can be mounted within the engine exhaust line, or mounted within the heat exchanger 32 or 41, or mounted within the oxidation catalyst housing 71.

In the embodiment of the method of the present invention which uses the inventive system 2, the engine 10, the oxidation catalyst 72, and the syngas catalyst 53, which are initially cold, are first run through a start-up (warm-up) phase. The start-up phase will generally involve starting the engine and allowing the engine exhaust temperature to reach steady state. The temperature of the engine exhaust stream 11 produced by the lean-burn engine 10 likely will be less than 900° F. and will more typically be in the range of from about 700° F. to about 850° F. (i.e., ±50° F.) (in other words, from 650° F. to 900° F.). During this phase the engine exhaust 11 flows through the oxidation catalyst housing 71 and heats oxidation catalyst 72. The syngas catalyst 53 is also heated by flowing air 40 through the air heater 41 and the air booster heater 42 and through the syngas reactor 50. The start-up phase is complete when the temperature of the engine exhaust exiting the exhaust oxidation system 14 exceeds the light-off temperature of the syngas and the temperature of the air 43 entering the syngas reactor 50 exceeds that which when mixed with fuel the mixture exceeds the light-off temperature of the syngas catalyst 53. The post start-up phase begins when gaseous fuel 31 is introduced to syngas reactor 50, the syngas reactions are initiated in syngas catalyst 53, and syngas begins flowing through line 54 into the engine exhaust stream 11.

The volume of the oxidation catalyst material 72 in the exhaust oxidation system 70 will preferably be sufficient such that the gas hourly space velocity (GHSV) of the combined exhaust and syngas stream through the oxidation catalyst 72 will preferably be not more than 300,000 $hr^{-1}$ and will more preferably be less than 150,000 $hr^{-1}$. The GHSV of the combined exhaust and syngas stream through the oxidation catalyst 72 will more preferably be in the range of from about 40,000 to about 95,000 (i.e., ±10%) $hr^{-1}$ (in other words, from 36,000 to 104,500 $hr^{-1}$). The substrate cell density of the oxidation catalyst 72 will preferably be in the range of from about 200 to about 700 (i.e., ±10%) cells per square inch and will more preferably be in the range of from about 230 to about 300 cells (i.e., ±10%) per square inch.

In the inventive method, the syngas 54 injected into the engine exhaust stream 11 oxidizes on the oxidation catalyst 72, liberates heat, and raises the operating temperature of the oxidation catalyst 72. The syngas produced by the syngas reactor 50 is preferably added to the engine exhaust stream 11 in an amount, which is directly or indirectly controlled, to maintain an operating temperature of the oxidation catalyst 72 of at least 1000° F., which can provide a methane oxidation efficiency of at least 60% at a GHSV through the catalyst 72 of about 90,000 (i.e., ±10%) $hr^{-1}$ (in other words, at from 81.000 to 99,000 $hr^{-1}$) and at least 72% at a GHSV of about 45,000 (i.e., ±10%) $hr^{-1}$. The oxidation catalyst 72 will more preferably be maintained at an operating temperature of at least 1100° F. to provide a methane oxidation efficiency of at least 75% at a GHSV of about 90,000 (i.e., ±10%) $hr^{-1}$ and at least 90% at a GHSV of about 45,000 (i.e., ±10%) $hr^{-1}$. The oxidation catalyst 72 will most preferably be maintained at an operating temperature in the range of from about 1100° F. to about 1300° F. (i.e., ±50° F.). The exhaust and syngas mixture flows through the oxidation catalyst 72 to produce an oxidized exhaust stream 14 which is discharged from the exhaust oxidation system 70.

The amount of the syngas stream 54 added to the engine exhaust stream 11 will preferably be indirectly controlled, as discussed below, by automatically controlling the amount of the fuel stream 31 delivered to the syngas reactor 50. The mass flow rate of the syngas added to the engine exhaust stream 11 will typically be in the range of from about 0.5% to about 10% (±10%) by weight (in other words, from 0.45% to 11% by weight) based upon the mass flow rate of engine exhaust stream 11. Line 13 carries the mixture of exhaust gas and syngas to the oxidation system 70.

The fuel delivered to the syngas reactor 50 for producing the syngas stream 54 will preferably be the same fuel as used in the lean-burn engine 10 and will also preferably be natural gas. As illustrated in FIG. 1, a slip stream of the engine fuel is preferably taken from the engine fuel line 30 or other source and carried to the syngas reactor 50 by the fuel line 31. Examples of other types of fuels which could be delivered to the syngas reactor 50 for producing the syngas stream 15 include, but are not limited to LP gas, propane, digester gas, landfill gas, and gaseous streams from natural gas processing (e.g. a deethanizer or depropanizer stream) or petroleum refining.

The light-off temperature of the syngas catalyst 53 for reforming natural gas will typically be in the range of from about 700° F. to about 850° F. (i.e., ±50° F.). In order to sustain the syngas reactions the temperature of the fuel-air mixture in the syngas mixing chamber 52 is maintained in the range of from about 700° F. to about 850° F. (i.e., ±50° F.). The chemical reactions taking place in syngas catalyst 53 increase the operating temperature of the syngas catalyst 53 and the syngas product 54 above that of the fuel-air feed mixture. For enhancing the production of $H_2$ and CO from natural gas, the operating temperature of the syngas catalyst 53 will preferably be in the range of from about 900° F. to about 1400° F. (i.e., ±50° F.) as measured at the outlet of catalyst 53 and will more preferably be in the range of from about 900° F. to about 1200° F. (i.e., ±50° F.).

As described above, achieving the light-off temperature of the syngas reactions in syngas catalyst 53 can be accomplished by heating the air stream 40 alone or by heating both the air stream 40 and the fuel stream 31. In the preferred embodiment shown in FIG. 1 both the air and the fuel streams are heated prior to introducing them to the syngas reactor mixing chamber 52.

Fuel stream 31 is heated in heat exchanger 32 which transfers heat from the engine exhaust line 11. From the fuel heat exchanger 32 the heated fuel flows to the syngas reactor 50 via line 33.

In the preferred embodiment shown in FIG. 1 the air stream 40 is heated using heat exchanger 41 (which transfers heat from the engine exhaust stream 11) in combination with an electric air booster heater 42. This 2-stage approach reduces the amount of electric power required to achieve the desired air temperature if using only an electric heater, and also gives good control of the final air temperature 43 regardless of temperature of the engine exhaust.

If only the air is being heated and not the fuel also, then the temperature of the heated air 43 must be high enough such that the temperature of the combined air-fuel mixture in syngas mixing chamber 52 exceeds the light-off temperature of the syngas reactions in syngas catalyst 53. Such an air temperature would be higher than the temperature of the engine exhaust stream 11, which necessitates either using an electric heater 42 alone capable of achieving the required temperature, or an electric heater in combination with a heat exchanger 41. In order to cause the temperature of the fuel and air mixture to exceed the light-off temperature of the syngas catalyst 53, the electric air heater 42 (alone or in combination with a heat exchanger 41) will preferably operate to heat the air supply stream 43 to a temperature of at least 1000° F., more preferably about 1150° F. (i.e., ±50° F.).

The composition of the syngas stream 54 produced in the syngas reactor 50 by the partial oxidation and/or reforming of natural gas is dependent upon the ratio of the mass flow rate of air 43 to the mass flow rate of fuel 33 and other variables (e.g., temperature). Control system 82 preferably automatically controls the rate of flow of air 43 to maintain the desired air-fuel ratio. The air-fuel ratio will be a sub-stoichiometric amount which provides a fuel-rich mixture. A sensor 84 for measuring the mass flow rate of fuel is located in the fuel supply line 31. A sensor 85 for measuring the mass flow rate of air is located in the air supply line 40. The rate of air flow will preferably be automatically controlled, based upon for example the measurement of the mass flow rate of the fuel stream 31 and the mass flow rate of the air stream 40 and the use of a flow ratio controller to maintain a desired mass ratio of the fuel and air delivered to the partial oxidation reactor 50. For natural gas, the air to fuel mass flow ratio will preferably be in the range of from about 4 to about 12 (i.e., ±10%) (in other words from 3.6 to 13.2) and will more preferably be in the range of from about 6 to about 8.75 (i.e., ±10%).

The composition of the syngas stream 54 produced in the syngas reactor 50 by the partial oxidation and/or reforming of natural gas is controlled by controlling the ratio of the mass flow rate of air to the mass flow rate of fuel. The composition of the syngas stream will typically comprise (on a percent by weight basis): 0.2% to 5% hydrogen; 2% to 30% carbon monoxide; 58% to 62% nitrogen; 1% to 4.5% carbon dioxide; and 0.3% to 4.5% methane.

Consequently, when the syngas stream 54 is added to the engine exhaust gas stream 11 leaving the lean-burn engine 10, the resulting mixed exhaust and syngas stream 13, prior to oxidation in the exhaust oxidation system 70, will typically have a hydrogen concentration of from 0.001% to 0.21% by weight and a carbon monoxide concentration of from 0.01% to 2.5% by weight, but will also typically include an additional 0.0015% to 0.14% by weight of methane. However, because the gaseous $H_2$ and CO contained in the syngas stream 54 light-off on the oxidation catalyst 72 at or below the normal operating temperature of the oxidation catalyst 72, the addition of the syngas stream 54 to the engine exhaust stream 11 is surprisingly effective for reducing or eliminating methane emissions in the oxidized engine exhaust 14 downstream of the oxidation catalyst 72, as compared to the methane emissions in the engine exhaust stream 11 leaving the lean-burn gas engine 10 (i.e., prior to the addition of the syngas stream 54), in spite of the fact that the syngas stream 54 could itself contain a higher mass flow rate of methane than does the engine exhaust stream 11.

In addition, the result is also surprising in view of the fact that directly adding an amount of natural gas to the engine exhaust stream 11 would not be effective because the temperature of the engine exhaust stream 11 is below the light-off temperature of natural gas on the oxidation catalyst, so the methane in the natural gas would simply pass through the oxidation catalyst 72 unoxidized and add to methane emissions.

FIG. 1 highlights two of the sets of sensors and controls for the system—the oxidation catalyst operating temperature is measured and used to control the mass flow rate of fuel to the syngas reactor, and the mass flow rate of fuel is measured and used to control the mass flow rate of air to the syngas reactor. The operating temperature of the oxidation catalyst 72 in the exhaust oxidation system 70, is controlled by control system 81 which preferably automatically controls the rate of flow of the natural gas 31 to the syngas reactor 50 based upon (a) the temperature of oxidation catalyst 72 itself, or (b) the temperature of the oxidized exhaust product stream 14 produced by the oxidation catalyst 72. A sensor 83 for measuring the temperature of oxidized exhaust stream 14 will preferably be located at, inside, or outside of the discharge of the oxidation catalyst housing 71. As mentioned above, the automatic control of the fuel stream 31 to the syngas reactor 50 operates to indirectly control the amount of the syngas stream 54 which is produced by the syngas reactor 50 and delivered to the engine exhaust stream 11. As mentioned above, as control system 81 varies the flow rate of fuel to the syngas reactor 50, control system 82 adjusts the flow rate of air to the syngas reactor 50 to maintain the desired fuel-air mass ratio.

Figure 2:
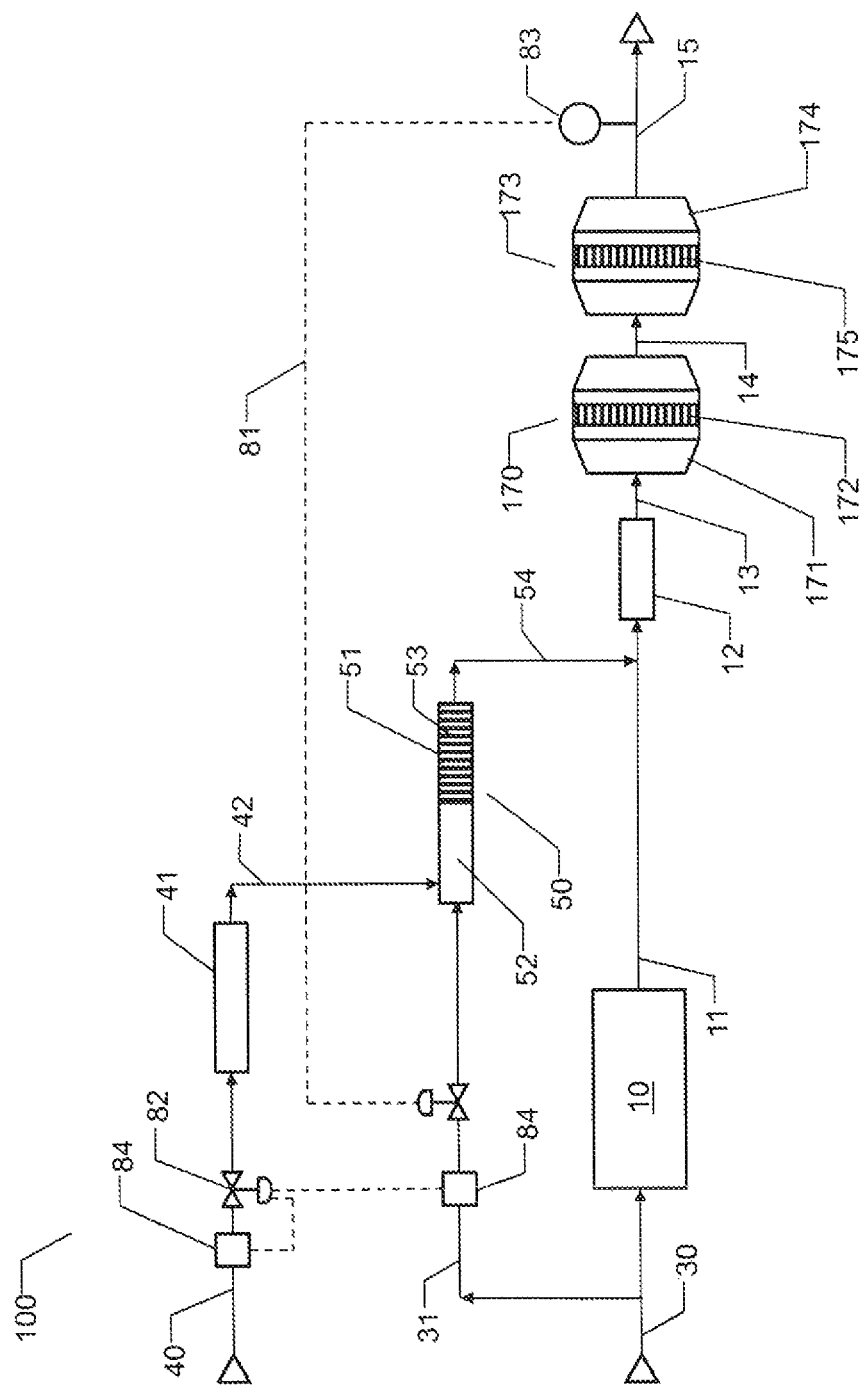
FIG. 2 schematically illustrates an alternative embodiment 100 of the inventive system and apparatus for oxidizing methane and other emissions in an exhaust stream produced by a lean-burn engine. The system and apparatus shown utilize a single-stage air heater and a two-stage exhaust oxidation system.

An alternative embodiment 100 of the inventive system and apparatus for oxidizing methane and other emissions contained in an engine exhaust stream 11 produced by a lean-burn engine 10 is illustrated in FIG. 2. The inventive system 100 is substantially identical to the inventive system 2. The key distinctions of embodiment 100 are (a) the use of a single-stage electric air heater (instead of a fuel heater and a two-stage air heater), and (b) a two-stage exhaust gas oxidation system. Two-stage oxidation system is particularly beneficial for low-temperature exhausts, such as from some 2-stroke gas engines. Comparing a typical 2-stroke gas engine to a typical 4-stroke gas engine, for the 2-stroke engine there is a larger temperature gap between the normal exhaust gas temperature and the exhaust gas temperature required to effectively oxidize methane. Overcoming this larger temperature gap for the 2-stroke engine requires the oxidation of a greater quantity of syngas across the oxidation catalyst than for a typical 4-stroke application. Controlling this large heat release without overheating all or part of the oxidation catalyst is more easily accomplished in two separate catalyst stages.

The inventive system 100 includes both a first stage oxidation system 170, located downstream of the exhaust and syngas mixer 12, and a second stage oxidation system 173 downstream of the first stage oxidation system 170. The first stage oxidation system 170 and the second stage oxidation system 173 can be in two separate housings (171 and 174) or can share a common housing.

The oxidation catalyst 175 used in the second stage oxidation system 173 is preferably the same as the oxidation catalyst 72 used in the exhaust oxidation system 70 of the inventive system 2 described above. In addition, as with the oxidation catalyst 72, the volume of oxidation catalyst material 175 in the second stage oxidation system 173 will preferably be sufficient such that the GHSV of the partially oxidized exhaust and syngas stream 14 through the second stage oxidation catalyst 175 will be not more than 300,000 $hr^{-1}$ and will more preferably be less than 150,000 $hr^{-1}$. The GHSV of the combined, partially oxidized exhaust and syngas stream 14 through the second stage oxidation catalyst 175 will more preferably be in the range of from about 40,000 to about 95,000 (i.e., ±10%) $hr^{-1}$. The substrate cell density of the second stage oxidation catalyst 175 will preferably be in the range of from about 100 to about 700 (i.e., ±10/a) cells per $inch^2$ and will more preferably be in the range of from about 200 to about 400 (i.e., ±10%) cells per $inch^2$.

The oxidation catalyst 172 used in the first stage oxidation system 170 preferably comprises platinum, palladium, and/or rhodium in a total amount in the range of from about 5 grams to about 90 grams (i.e., ±10%) per cubic foot of the oxidation catalyst. More preferably, the first stage oxidation catalyst 172 comprises: (a) a support or substrate formed of a material selected from cordierite, mullite or FeCrAlY or similar high temperature foil (most preferably high temperature foil); (b) a washcoat, applied to the support or substrate, comprising one or more materials selected from aluminum oxide, cerium oxide, zirconium oxide, or silicon dioxide (most preferably aluminum oxide); and (c) one or more platinum group metals, selected from platinum, palladium, and rhodium (most preferably platinum), which is/are provided on and/or in the washcoat in an amount in the range of from about 5 grams to about 90 grams (i.e., ±10%) grams per cubic foot of the first stage oxidation catalyst 172.

Examples of additional components and/or additives which can be used in the first stage oxidation catalyst 172 and second stage catalyst 175 (e.g., in the washcoats thereof) include lanthanum oxide, barium oxide, barium carbonate, cerium oxide, zirconium oxide and mixtures thereof.

The volume of the catalytic material 172 in the first oxidation system 170 will preferably be such that the GHSV of the engine exhaust and syngas mixture 13 flowing through the first stage oxidation catalyst 172 will be in the range of from about 200,000 to about 400,000 (i.e., ±10%) $hr^{-1}$. The substrate cell density of the first stage oxidation catalyst 172 will preferably be in the range of from about 25 to about 250 (i.e., ±10%) cells per square inch and will more preferably be in the range of from about 50 to about 200 (i.e., ±10%) cells per square inch.

The inventive system 100 achieves the exhaust temperature increase necessary to reach efficient methane oxidation by releasing the heat of combustion of the syngas across two oxidation stages, releasing from about 25% to about 75% (i.e., ±5%) of the heat of combustion of the syngas $H_2$ and CO components in the first stage oxidation system 170 and then combusting the remainder of the syngas as well as the methane contained in the combined engine exhaust and syngas stream 14, in the second stage oxidation system 173.

The oxidation efficiency of the first stage oxidation system 170 is significantly more limited than the oxidation efficiency of the second stage oxidation system 173 due to (i) the relatively high GHSV, (ii) the relatively low platinum group metal loading, and (iii) the relatively low substrate cell density of the first stage oxidation catalyst 172 compared to the second stage oxidation catalyst 175. However, the $H_2$ contained in the combined engine exhaust and syngas stream 13 lights-off easily, even at the relatively low temperature of the 2-stroke engine exhaust 11, and is completely combusted, or substantially completely combusted (i.e., within 5%) in the first stage oxidation system 170, thus increasing the temperature of the partially oxidized exhaust and syngas stream 14. The remaining CO as well as the methane contained in the partially oxidized exhaust and syngas stream 14 are then combusted in the second stage oxidizer 173.

The temperature of the partially oxidized exhaust and syngas stream 14 flowing from the first stage oxidation system 170 to the second stage oxidation system 173 will preferably be at least 750° F. and will more preferably be in the range of from about 850° F. to about 950° F. (i.e., within ±50°). The heat released by the subsequent combustion in the second stage oxidation system 173 of the CO and the non-methane and non-ethane hydrocarbon components contained in the partially oxidized exhaust and syngas stream 14 preferably increases the operating temperature of the second stage oxidation catalyst 173 to at least 1000° F. The operating temperature of the second stage oxidation catalyst 175 will more preferably be at least 1100° F. and will most preferably be in the range of from about 1100° F. to about 1200° F. (i.e., ±50°).

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A method of oxidizing methane in an exhaust gas produced by a lean-burn engine comprising the steps of:
   a) discharging from the lean-burn engine an exhaust gas stream which comprises an amount of methane, the exhaust gas stream having a temperature of less than 900° F.;
   b) delivering the exhaust gas stream through an exhaust oxidation system of an oxidation assembly, the exhaust oxidation system having one or more exhaust oxidation stages, the one or more exhaust oxidation stages comprising at least a final oxidation stage, the final oxidation stage having an oxidation catalyst therein which comprises one or more of platinum, palladium, and rhodium, and the temperature of the exhaust gas stream being less than a methane light-off temperature of the oxidation catalyst in the final oxidation stage, and
   c) prior to step (b), adding a combustible gas stream to the exhaust gas stream which flows through the exhaust oxidation system with the exhaust gas stream and is oxidized in the one or more exhaust oxidation stages to increase the temperature of the exhaust gas stream and heat the oxidation catalyst in the final oxidation stage to a temperature above the methane light-off temperature of the oxidation catalyst, the combustible gas stream and the exhaust gas stream forming a combined exhaust gas and combustible gas stream, the combustible gas stream having a light-off temperature on the oxidation catalyst in the final oxidation stage which is less than the methane light-off temperature of the oxidation catalyst, the combined exhaust gas and combustible gas stream having a temperature upstream of the one or more exhaust oxidation stages of the exhaust oxidation system which is less than the methane light-off temperature of the oxidation catalyst, and the light-off temperature of the combustible gas stream on the oxidation catalyst being less than or equal to the temperature of the combined exhaust gas and combustible gas stream upstream of the one or more exhaust oxidation stages of the exhaust oxidation system.

2. The method of claim 1 further comprising the exhaust oxidation system having only a single exhaust oxidation stage, the single exhaust oxidation stage being the final oxidation stage.

3. The method of claim 1 further comprising the combustible gas stream being a syngas stream comprising $H_2$ and CO.

4. The method of claim 1 further comprising the exhaust gas stream and the combustible gas stream being delivered through the oxidation catalyst in the final oxidation stage at a gas hourly space velocity of not more than 300,000 $hr^{-1}$.

5. The method of claim 1 further comprising the combustible gas stream being supplied to the oxidation assembly from an outside source which is not part of the oxidation assembly.

6. The method of claim 1 further comprising directly or indirectly maintaining the temperature of the oxidation catalyst in the final oxidation stage of the exhaust oxidation system by directly or indirectly controlling an amount of the combustible gas stream which is added to the exhaust gas stream in step (c).

7. The method of claim 1 further comprising the oxidation catalyst in the final oxidation stage comprising:
   a support or substrate formed of cordierite, mullite, or FeCrAlY, or formed of other material in a form of a foil having a cell density of from about 100 to about 700 cells per $inch^2$;

a wash coat on the support or substrate comprising one or more materials selected from aluminum oxide, cerium oxide, zirconium oxide, and silicon dioxide;

platinum present on and/or in the wash coat in an amount in a range of from 0 grams to about 120 grams per cubic foot of the oxidation catalyst;

palladium present on and/or in the wash coat in an amount in a range of from 0 to about 120 grams per cubic foot of the oxidation catalyst;

rhodium present on and/or in the wash coat in an amount in a range of from 0 to about 120 grams per cubic foot of the oxidation catalyst; and the platinum, the palladium, and/or the rhodium being present on and/or in the wash coat in a total amount in a range of from about 5 to about 120 grams per cubic foot of the oxidation catalyst.

8. The method of claim 7 further comprising the wash coat of the oxidation catalyst of the final oxidation stage also comprising one or more modifiers selected from lanthanum oxide, barium oxide, barium carbonate, cerium oxide, and zirconium oxide.

9. The method of claim 1 further comprising the exhaust oxidation system having two or more of said exhaust oxidation stages and no more than 80% of a total heat of oxidation of the combustible gas stream is released in any one of the two or more exhaust oxidation stages.

10. The method of claim 9 further comprising:

the one or more exhaust oxidation stages comprising an initial oxidation stage and the final oxidation stage and the initial oxidation stage having an oxidation catalyst therein comprising:

a support or substrate formed of cordierite, mullite, or FeCrAlY, or formed of other material in a form of a foil having a cell density of from about 50 to about 200 cells per inch$^2$, a wash coat on the support or substrate comprising one or more materials selected from aluminum oxide, cerium oxide, zirconium oxide, and silicon dioxide, platinum present on and/or in the wash coat of the oxidation catalyst of the initial oxidation stage in an amount in a range of from 0 grams to about 90 grams per cubic foot of the oxidation catalyst of the initial oxidation stage, palladium present on and/or in the wash coat of the oxidation catalyst of the initial oxidation stage in an amount in a range of from 0 to about 90 grams per cubic foot of the oxidation catalyst of the initial oxidation stage, rhodium present on and/or in the wash coat of the oxidation catalyst of the initial oxidation stage in an amount in a range of from 0 to about 90 grams per cubic foot of the oxidation catalyst of the initial oxidation stage; and the platinum, the palladium, and/or the rhodium being present on and/or in the wash coat of the oxidation catalyst of the initial oxidation stage in a total amount in a range of from about 5 to about 90 grams per cubic foot of the oxidation catalyst of the initial oxidation stage.

11. The method of claim 10 further comprising the wash coat of the oxidation catalyst of the initial oxidation stage also comprising one or more modifiers selected from lanthanum oxide, barium oxide, barium carbonate, cerium oxide, and zirconium oxide.

12. The method of claim 1 further comprising the combustible gas stream being a syngas stream produced by partial oxidation and/or reforming of a fuel in a syngas reactor, the syngas reactor being included in the oxidation assembly and the syngas reactor having a syngas catalytic material therein selected from a partial oxidation catalyst, a steam reforming catalyst, or both.

13. The method of claim 12 further comprising the fuel being selected from natural gas, a digester gas, a landfill gas, or liquified petroleum gases.

14. The method of claim 12 further comprising the fuel also being combusted in the lean-burn engine.

15. The method of claim 14 further comprising the fuel being natural gas.

16. The method of claim 12 further comprising directly or indirectly maintaining the temperature of the oxidation catalyst in the final oxidation stage above the methane light-off temperature of the oxidation catalyst in the final oxidation stage by automatically controlling an amount of the fuel delivered to the syngas reactor.

17. The method of claim 16 further comprising automatically controlling a rate of air combined with the fuel using a ratio controller based upon a rate of the fuel delivered to the syngas reactor.

18. The method of claim 12 further comprising combining air and the fuel to form a fuel-rich mixture and then delivering the fuel-rich mixture through the syngas catalytic material in the syngas reactor.

19. The method of claim 18 further comprising delivering the fuel-rich mixture to the syngas catalytic material at a temperature greater than a syngas light-off temperature of the syngas catalytic material by heating the air, or by heating both the air and the fuel, prior to combining the air and the fuel.

20. The method of claim 19 further comprising the air being heated using an electric heater alone or by heat exchange with the exhaust gas stream prior to further heating the air using the electric heater.

21. The method of claim 18 further comprising the syngas catalytic material in the syngas reactor comprising:

a support or substrate formed of cordierite, mullite, or FeCrAlY, or formed of other material in a form of a foil having a cell density of from about 100 to about 700 cells per inch$^2$;

a wash coat on the support or substrate of the syngas catalytic material comprising one or more materials selected from aluminum oxide, cerium oxide, zirconium oxide, and silicon dioxide; and palladium, platinum, and/or rhodium present on and/or in the wash coat of the syngas catalytic material in a total amount in a range of from about 2 grains to about 150 grains per cubic foot of the syngas catalytic material.

22. The method of claim 21 further comprising the wash coat of the syngas catalytic material also comprising one or more modifiers selected from lanthanum oxide, barium oxide, barium carbonate, cerium oxide, and zirconium oxide.

23. The method of claim 21 further comprising all or a portion of the syngas catalytic material being the partial oxidation catalyst and the partial oxidation catalyst comprising a total amount of the palladium, platinum, and/or rhodium present on and/or in the wash coat of the syngas catalytic material being in a range of from about 10 grams to about 150 grams per cubic foot of the partial oxidation catalyst.

24. The method of claim 21 further comprising all or a portion of the syngas catalytic material being the steam reforming catalyst and the steam reforming catalyst comprising a total amount of the palladium, platinum, and/or rhodium present on and/or in the wash coat of the syngas catalytic material being in a range of from about 2 grams to about 90 grams per cubic foot of the steam reforming catalyst.

25. An oxidation system for oxidizing methane in an exhaust gas stream produced by a lean-burn engine comprising:
   one or more exhaust oxidation stages through which the exhaust gas stream is delivered, the one or more exhaust oxidation stages comprising at least a final oxidation stage, the final oxidation stage having an exhaust oxidation catalyst therein which comprises one or more of platinum, palladium, and rhodium in a total amount of from about 5 grams to about 120 grams per cubic foot of the exhaust oxidation catalyst, and the exhaust oxidation catalyst having a methane light-off temperature which is greater than a temperature of the exhaust gas stream;
   a syngas reactor in which a syngas stream comprising $H_2$ and CO is produced by partial oxidation and/or reforming of a fuel-rich mixture comprising a stream of fuel having a stream of air combined therewith, the syngas stream being added to the exhaust gas stream prior to delivering the exhaust gas stream through the one or more exhaust oxidation stages, and the syngas stream being added to the exhaust gas stream and oxidized in the one or more exhaust oxidation stages in an amount sufficient to heat the exhaust oxidation catalyst in the final oxidation stage to a temperature above the methane light-off temperature of the exhaust oxidation catalyst; and
   a control system which directly or indirectly maintains the temperature of the exhaust oxidation catalyst in the final oxidation stage above the methane light-off temperature of the exhaust oxidation catalyst by directly or indirectly controlling the amount of the syngas stream which is added to the exhaust gas stream.

26. The oxidation system of claim 25 further comprising:
   the stream of fuel comprising a fuel which is also combusted in the lean-burn engine, the stream of fuel being taken from a line or other source which supplies the fuel to the lean-burn engine;
   the control system operating to indirectly control the amount of the syngas stream which is added to the exhaust gas stream to directly or indirectly maintain the temperature of the exhaust oxidation catalyst in the final oxidation stage, by automatically controlling an amount of the stream of fuel which is taken from the line or source which supplies the fuel to the lean-burn engine; and
   the oxidation system also comprising a ratio controller which automatically controls an amount of the stream of air which is combined with the stream of fuel.

27. The oxidation system of claim 25 further comprising an electric heater which heats the stream of air prior to combining the stream of air with the stream of fuel, the electric heater being automatically controlled to maintain a downstream temperature of the fuel-rich mixture above a light-off temperature of a syngas catalytic material in the syngas reactor.

28. The oxidation system of claim 25 further comprising the syngas reactor having a syngas catalytic material therein which comprises:
   a partial oxidation catalyst comprising a total of from about 10 to about 150 grams of palladium, platinum, and/or rhodium per cubic foot of the partial oxidation catalyst;
   a reforming catalyst comprising a total of from about 2 to about 90 grams of palladium, platinum and/or rhodium per cubic foot of the reformer catalyst; or
   a combination thereof.

29. The oxidation system of claim 25 further comprising:
   the one or more exhaust oxidation stages comprising an initial oxidation stage and the final oxidation stage and
   the initial oxidation stage having an initial stage oxidation catalyst therein which comprises a total of from about 5 to about 90 grams of platinum, palladium, and/or rhodium per cubic foot of the initial stage oxidation catalyst.

* * * * *